United States Patent
Cho et al.

(10) Patent No.: US 9,855,852 B2
(45) Date of Patent: Jan. 2, 2018

(54) CHARGING APPARATUS FOR UNMANNED AERIAL VEHICLES AND METHOD THEREOF

(71) Applicant: Korea Railroad Research Institute, Uiwang-Si (KR)

(72) Inventors: In Ho Cho, Seoul (KR); Shin Myung Jung, Gyeonggi-do (KR); Yong Jang Kwon, Seoul (KR); Byung Song Lee, Seongnam-si (KR)

(73) Assignee: Korea Railroad Research Institute, Uiwang-Si (KR)

( * ) Notice: Subject to any disclaimer, the term of this patent is extended or adjusted under 35 U.S.C. 154(b) by 82 days.

(21) Appl. No.: 15/051,483

(22) Filed: Feb. 23, 2016

(65) Prior Publication Data

US 2017/0057365 A1    Mar. 2, 2017

(30) Foreign Application Priority Data

Aug. 26, 2015    (KR) .................. 10-2015-0120579

(51) Int. Cl.
*B60L 11/18*    (2006.01)
*B64C 39/02*    (2006.01)
(Continued)

(52) U.S. Cl.
CPC ......... *B60L 11/182* (2013.01); *B60L 11/1827* (2013.01); *B60L 11/1829* (2013.01); *B60L 11/1833* (2013.01); *B64C 39/024* (2013.01); *B64F 1/36* (2013.01); *G01S 19/13* (2013.01); *H02J 7/025* (2013.01); *H02J 50/10* (2016.02); *H02J 50/90* (2016.02); *B64C 2201/042* (2013.01); *B64C 2201/066* (2013.01); *B64C 2201/145* (2013.01); *G01S 19/14* (2013.01)

(58) Field of Classification Search
CPC ................ B60L 11/182; B60L 11/1833; B60L 11/1829; B60L 11/1827; B60L 11/1831; B64C 2201/066; H02J 7/025
See application file for complete search history.

(56) References Cited

U.S. PATENT DOCUMENTS

| 2011/0264297 | A1* | 10/2011 | Nakano ............. | G06F 1/26 700/297 |
| 2014/0361735 | A1* | 12/2014 | Li ................. | H02J 7/025 320/108 |

(Continued)

FOREIGN PATENT DOCUMENTS

KR    101194676    10/2012

*Primary Examiner* — Spencer D Patton
(74) *Attorney, Agent, or Firm* — Wolf, Greenfield & Sacks, P.C.

(57) ABSTRACT

A charging apparatus for unmanned aerial vehicles and a charging method thereof. The charging apparatus includes: a transmit coil provided to a charging station and generating a magnetic field; a reception coil generating induced electromotive force according to variation of magnetic flux of the transmit coil; a reception coil adjuster adjusting at least one of an inclination and an orientation of the reception coil; and a controller controlling at least one of the inclination and the orientation of the reception coil by controlling the reception coil adjuster according to magnitude of the induced electromotive force generated in the reception coil by the magnetic field generated in the transmit coil.

14 Claims, 5 Drawing Sheets

(51) Int. Cl.
*B64F 1/36* (2017.01)
*G01S 19/13* (2010.01)
*H02J 7/02* (2016.01)
*H02J 50/10* (2016.01)
*H02J 50/90* (2016.01)
G01S 19/14 (2010.01)

(56) References Cited

U.S. PATENT DOCUMENTS

2015/0204928 A1* 7/2015 Hoover .................. H02J 7/0042
320/108
2016/0075249 A1* 3/2016 Grabar ................ B60L 11/1846
320/108
2016/0257424 A1* 9/2016 Stabler ................... A63H 27/12

* cited by examiner

CHARGING APPARATUS FOR UNMANNED AERIAL VEHICLES AND METHOD THEREOF

CROSS-REFERENCE TO RELATED APPLICATIONS

This application claims the benefit of Korean Patent Application No. 2015-0120579, filed on Aug. 26, 2015, the disclosure of which is incorporated herein in its entirety by reference.

TECHNICAL FIELD

The present invention generally relates to a charging apparatus for unmanned aerial vehicles and a method thereof, and more particularly, to a charging apparatus for unmanned aerial vehicles, which has improved charging efficiency through adjustment of an inclination and orientation of a reception coil within an unmanned aerial vehicle, and a method thereof.

BACKGROUND

Generally, an unmanned aerial vehicle (UAV) refers to an air vehicle capable of autonomously flying without a pilot according to a previously input program or through self-recognition of surrounding environments (such as obstacles and airplanes).

The unmanned aerial vehicle generally carries out high altitude long endurance missions for observation, monitoring, communication relay, weather observation, earth observation, and the like. Such an unmanned aerial vehicle employs power supplied from charged batteries.

Particularly, in a wireless charging method by which an unmanned aerial vehicle is wirelessly charged, a magnetic flux is generated around a magnetic flux transmit coil by supplying electric current to the transmit coil such that a reception coil placed near the transmit coil receives the magnetic flux and induces electric current.

However, such magnetic induction has a problem in that charging efficiency significantly differs depending upon a positional relationship between the transmit coil and the reception coil.

In order to solve this problem, conventionally, a magnet is provided to each of a transmit coil and a reception coil of a wireless charging device such that coupling between the transmit coil and the reception coil can be improved through magnetic force between the magnets thereof, or the wireless charging device is provided with a plurality of transmit coils.

However, a charging method using magnets has problems in that the reception coil must be placed within the range of magnetic force, and in that the coils are likely to be broken or damaged when frequently moved.

Moreover, a charging method using a plurality of transmit coils has problems of high manufacturing costs and low charging efficiency.

The background technique of the invention is disclosed in Korean Patent Registration No. 1,194,676 (issue date: 2012 Dec. 19) entitled "Wireless servo actuator capable of performing position control in up-down and right-left directions in wireless remote control type".

SUMMARY

Some embodiments of the present invention provide a charging apparatus for unmanned aerial vehicles, which has improved charging efficiency by improving coupling between a reception coil of an unmanned aerial vehicle and a transmit coil of a charging station through adjustment of an inclination and orientation of the reception coil of the unmanned aerial vehicle towards the transmit coil of the charging station after moving the unmanned aerial vehicle to the charging station, and a method thereof.

In accordance with one aspect of the present invention, a charging apparatus for unmanned aerial vehicles includes: a transmit coil provided to a charging station and generating a magnetic field; a reception coil generating induced electromotive force according to variation of magnetic flux of the transmit coil; a reception coil adjuster configured to adjust at least one of an inclination and an orientation of the reception coil; and a controller controlling at least one of the inclination and the orientation of the reception coil by controlling the reception coil adjuster according to magnitude of the induced electromotive force generated in the reception coil by the magnetic field generated in the transmit coil.

The controller may control the reception coil adjuster such that the induced electromotive force generated in the reception coil reaches a maximum value.

The charging apparatus may further include a magnetic flux detector measuring the magnetic flux generated in the transmit coil and sensing a magnetic flux pattern based on the measured magnetic flux, and the controller may recognize the charging station based on the magnetic flux pattern sensed by the magnetic flux detector.

The magnetic flux detector may include a plurality of magnetic flux detectors arranged about the reception coil.

The magnetic flux detectors may be radially arranged about the reception coil.

The controller may compare magnitudes of magnetic fluxes detected by the magnetic flux detectors and may determine a landing location based on a comparison result to allow a body of an unmanned aerial vehicle to land at the landing location.

The controller may control the body of the unmanned aerial vehicle to land after moving the body of the unmanned aerial vehicle to a location at which the magnitudes of the magnetic fluxes detected by the magnetic flux detectors are within a preset range of deviation.

The magnetic flux detectors may be provided to a lower side of the body of the unmanned aerial vehicle.

The charging apparatus may further include a GPS receiver receiving a GPS signal from a global positioning system (GPS) satellite to detect positional coordinates of the unmanned aerial vehicle, and the controller may control the unmanned aerial vehicle to move to the charging station based on positional coordinates of the charging station and the positional coordinates detected by the GPS receiver.

In accordance with another aspect of the present invention, a charging apparatus for unmanned aerial vehicles includes: a transmit coil provided to a charging station and generating a magnetic field; a reception coil generating induced electromotive force according to variation of magnetic flux of the transmit coil; a magnetic flux detector measuring a magnetic flux generated in the transmit coil and sensing a magnetic flux pattern based on the measured magnetic flux; and a controller recognizing a charging station based on the magnetic flux pattern sensed by the magnetic flux detector.

The magnetic flux detector may include a plurality of magnetic flux detectors arranged about the reception coil.

The magnetic flux detectors may be radially arranged about the reception coil.

The controller may compare magnitudes of magnetic fluxes detected by the magnetic flux detectors and may determine a landing location based on a comparison result to allow a body of an unmanned aerial vehicle to land at the landing location.

The controller may control the body of the unmanned aerial vehicle to land after moving the body of the unmanned aerial vehicle to a location at which the magnitudes of the magnetic fluxes detected by the magnetic flux detectors are within a preset range of deviation.

The magnetic flux detector may be provided to a lower side of the body of the unmanned aerial vehicle.

The charging apparatus may further include a GPS receiver receiving a GPS signal from a global positioning system (GPS) satellite to detect positional coordinates of the unmanned aerial vehicle, and the controller may control the unmanned aerial vehicle to move to the charging station based on positional coordinates of the charging station and the positional coordinates detected by the GPS receiver.

In accordance with a further aspect of the present invention, a charging method of an unmanned aerial vehicle includes: measuring, by magnetic flux detectors, a magnetic flux generated in a transmit coil of a charging station, and sensing a magnetic flux pattern based on the measured magnetic flux; recognizing, by a controller, the charging station based on the magnetic flux pattern sensed by the magnetic flux detectors, and controlling a body of the unmanned aerial vehicle to land through a drive module; and generating, by a reception coil, induced electromotive force according to variation of the magnetic flux of the transmit coil to charge a battery.

In the step of controlling the body of the unmanned aerial vehicle to land through the drive module, the controller may compare magnitudes of magnetic fluxes detected by the magnetic flux detectors and may determine a landing location based on a comparison result to allow the body of the unmanned aerial vehicle to land at the landing location.

The controller may control the body of the unmanned aerial vehicle to land after moving the body of the unmanned aerial vehicle to a location at which the magnitudes of the magnetic fluxes detected by the magnetic flux detectors are within a preset range of deviation.

The method may further include receiving, by a GPS receiver, a GPS signal from a global positioning system (GPS) satellite to detect positional coordinates of the body of the unmanned aerial vehicle, and the controller may control the body of the unmanned aerial vehicle to move to the charging station based on the positional coordinates detected by the GPS receiver through a drive module, followed by recognizing the charging station based on the magnetic flux patterns sensed by the magnetic flux detectors.

In the step of charging the battery, the controller may adjusted at least one of an inclination and an orientation of the reception coil through a reception coil adjuster such that the induced electromotive force generated by the reception coil reaches a maximum value.

The method may further include controlling, by the controller, the body of the unmanned aerial vehicle to move to the positional coordinates of the charging station through the drive module based on the positional coordinates detected by the GPS receiver.

Embodiments of the present invention improve coupling between a reception coil of an unmanned aerial vehicle and a transmit coil of a charging station through adjustment of an inclination and orientation of the reception coil of the unmanned aerial vehicle towards the transmit coil of the charging station after moving the unmanned aerial vehicle to the charging station, thereby improving charging efficiency.

BRIEF DESCRIPTION OF THE DRAWINGS

The above and other aspects, features and advantages of the present invention will become apparent from the following description of embodiments given in conjunction with the accompanying drawings, in which.

DETAILED DESCRIPTION

Hereinafter, embodiments of the present invention will be described in detail with reference to the accompanying drawings. It should be noted that the drawings are not to precise scale and may be exaggerated in thicknesses of lines or sizes of components for descriptive convenience and clarity only. In addition, the terms used herein are defined by taking functions of the present invention into account and can be changed according to user or operator custom or intention. Therefore, definition of the terms should be made according to the overall disclosure set forth herein.

Figure 1:
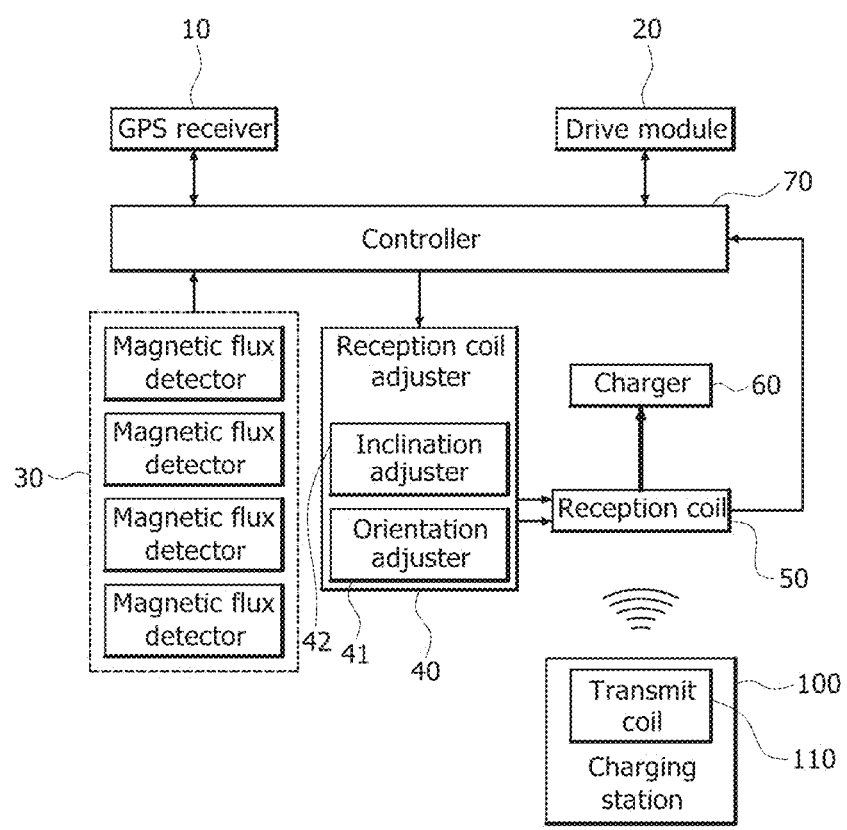
FIG. 1 is a block diagram of a charging apparatus for unmanned aerial vehicles according to one embodiment of the present invention.
Figure 2:
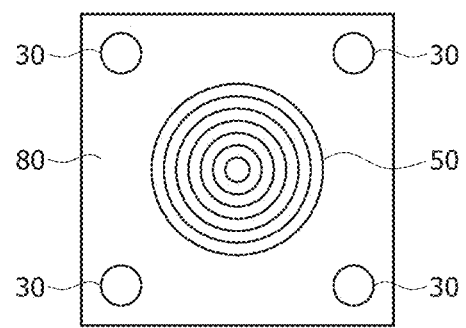
FIG. 2 is a plan view of a substrate according to one embodiment of the present invention.
Figure 3:
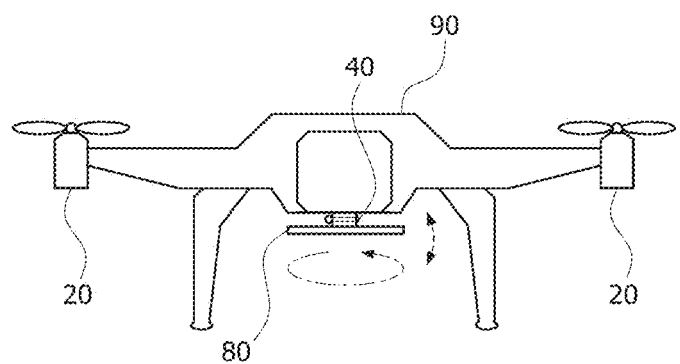
FIG. 3 is a view illustrating exemplary operation of adjusting an inclination and orientation of the substrate according to one embodiment of the present invention.
Figure 4:
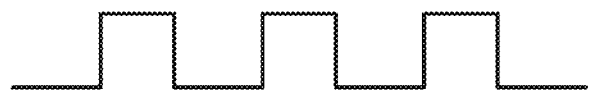
FIG. 4 is a view illustrating a magnetic flux pattern according to one embodiment of the present invention.

FIG. 1 is a block diagram of a charging apparatus for unmanned aerial vehicles according to one embodiment of the present invention; FIG. 2 is a plan view of a substrate according to one embodiment of the present invention; FIG. 3 is a view illustrating exemplary operation of adjusting an inclination and orientation of the substrate according to one embodiment of the present invention; and FIG. 4 is a view illustrating a magnetic flux pattern according to one embodiment of the present invention.

Referring to FIG. 1, a charging apparatus for unmanned aerial vehicles according to one embodiment of the present invention includes a GPS (Global Positioning System) receiver 10, a drive module 20, magnetic flux detectors 30, a reception coil adjuster 40, a reception coil 50, a charger 60, a controller 70, a charging station 100, and a transmit coil 110.

As an unmanned aerial vehicle according to this embodiment, a helicopter or a quadcopter may be used.

The GPS receiver 10 receives GPS signals from a GPS satellite at preset time intervals and generates positional coordinates of the unmanned aerial vehicle based on the received GPS signals.

The drive module 20 performs not only flight of a body 90 of the unmanned aerial vehicle but also taking off and landing of the body of the unmanned aerial vehicle. The drive module 20 may include an engine (not shown) configured to generate power for flight, a propeller (not shown) rotated by power from the engine, and the like. Further, the drive module 20 includes an altitude sensor (not shown) that measures an altitude of the body 90 to maintain a preset altitude of the unmanned aerial vehicle, an obstacle sensor (not shown) which senses an obstacle on a flight path to allow the unmanned aerial vehicle to avoid the obstacle, and a gyro sensor (not shown) which senses a posture of the body 90 to allow the body 90 to fly in a stable flying posture.

The reception coil 50 generates induced electromotive force according to variation of a magnetic flux generated from the transmit coil 110 and applies the induced electromotive force to the charger 60.

That is, when the magnetic flux varies in the transmit coil 110 of the charging station 100, the reception coil 50 generates induced electromotive force through magnetic induction and the induced electromotive force generated by the reception coil 50 is applied to the charger 60, which in turn charges a battery (not shown) of the unmanned aerial vehicle.

The charger 60 converts voltage generated by the induced electromotive force generated in the reception coil 50 into direct current having a suitable voltage for battery charging in order to charge the battery.

As shown in FIG. 2 and FIG. 3, the reception coil 50 may be disposed at the center of a substrate 80 provided to a lower side of the body 90. The substrate 80 allows adjustment of an inclination and orientation thereof, thereby improving coupling between the reception coil 50 and the transmit coil 110.

The magnetic flux detectors 30 are disposed on the substrate 80 provided to the lower side of the body 90 to measure a magnetic flux generated from the transmit coil 110 of the charging station 100 and to sense a magnetic flux pattern based on the measured magnetic flux.

For reference, although the magnetic flux detectors 30 are illustrated as being disposed on the substrate 80 in this embodiment, the magnetic flux detectors 30 may be disposed at various locations, as needed.

As shown in FIG. 3, four magnetic flux detectors 30 may be disposed about the reception coil 50 on the substrate 80 to face each other such that the reception coil 50 is located at the center of the substrate 80 and surrounded thereby.

The magnetic flux pattern is generated from the transmit coil 110 of the charging station 100 such that the controller 70 of the unmanned aerial vehicle can recognize the charging station 100 based on the magnetic flux pattern, and is obtained by converting the magnitude of the magnetic flux into a certain pattern, as shown in FIG. 4.

The reception coil adjuster 40 allows the reception coil 50 to induce a maximum electromotive force by adjusting an inclination and orientation of the reception coil 50 such that the reception coil 50 is directed towards the transmit coil 110. Specifically, the reception coil adjuster 40 adjusts the inclination and orientation of the reception coil 50 to improve coupling between the reception coil 50 and the transmit coil 110, thereby improving charging efficiency.

The transmit coil 110 is provided to the charging station 100 and transfers power to the reception coil 50 through electromagnetic induction when receiving the power from the charging station 100. The transmit coil 110 generates a magnetic field in order to generate induced electromotive force in the reception coil 50.

As indicated by an arrow in FIG. 3, the reception coil adjuster 40 is provided to the lower side of the body 90 and adjusts the inclination and orientation of the reception coil 50. The reception coil adjuster 40 includes an inclination adjuster 42 and an orientation adjuster 41. Since the reception coil 50 is disposed on the substrate 80, the reception coil adjuster 40 adjusts the inclination and orientation of the reception coil 50 by adjusting the inclination and orientation of the substrate 80.

The inclination adjuster 42 adjusts the inclination of the reception coil 50, that is, an angle of the reception coil in a direction perpendicular to the ground, and the orientation adjuster 41 adjusts the orientation of the reception coil 50, that is, a rotational angle of the reception coil 50 in a direction parallel to the ground.

That is, according to the location of the transmit coil 110, the inclination adjuster 42 may adjust the angle of the reception coil 50 in the perpendicular direction of the reception coil 50 and the orientation adjuster 41 may adjust the rotational angle of the reception coil 50 in the horizontal direction of the reception coil 50, whereby the reception coil 50 is directed towards the transmit coil 110. As a result, coupling between the reception coil 50 and the transmit coil 110 is improved, thereby improving charging efficiency.

The controller 70 controls the drive module 20 based on positional coordinates of the charging station 100 and the positional coordinates input from the GPS receiver 10 to move the body 90 to the charging station 100.

After moving the body 90 to the charging station 100, the controller 70 detects the magnetic flux pattern through the magnetic flux detectors 30, and compares the detected magnetic flux pattern with a preset magnetic flux pattern stored therein to recognize the corresponding charging station 100.

In some embodiments, the preset magnetic flux pattern may be set for each charging station 100 and may act as a reference for recognition of the presence of the corresponding charging station 100. Accordingly, the controller 70 can more accurately recognize the location of the charging station 100 based on the preset magnetic flux pattern.

On the other hand, the controller 70 compares magnitudes of magnetic fluxes detected by the magnetic flux detectors 30, detects a location of the charging station 100 generating a magnetic flux, the magnitude of which is within a preset range of deviation, and moves the body 90 to the corresponding location through the drive module 20 to land the body 90 at the corresponding location.

The present range of deviation means a present range of difference between magnitudes of magnetic fluxes, which are detected by the magnetic flux detectors 30. The magnitudes of the magnetic fluxes detected by the magnetic flux detectors 30 differ according to locations of the magnetic flux detectors 30 with respect to a location of the transmit coil 110, and similarity between the magnitudes of the magnetic fluxes relates to similarity between distances from the magnetic flux detectors 30 to the transmit coil 110. Accordingly, since the magnetic flux detectors 30 are arranged to face each other about the reception coil 50 in this embodiment, the magnitudes of magnetic fluxes detected by the magnetic flux detectors 30 are within the preset range of deviation when the transmit coil 110 is located below the reception coil 50 in the perpendicular direction of the reception coil 50. At this time, matching between the reception coil 50 and the transmit coil 110 can be significantly improved. As a result, the magnitude of the induced electromotive force generated in the reception coil can be maximized.

Then, the controller 70 measures the magnitude of the induced electromotive force generated in the reception coil 50 and controls the reception coil adjuster 40 such that the measured electromotive force reaches a maximum value. Specifically, the controller 70 adjusts an angle of the reception coil 50 in the perpendicular direction through the inclination adjuster 42, and adjusts the rotational angle of the reception coil 50 in the horizontal direction through the orientation adjuster 41, thereby improving coupling between the reception coil 50 and the transmit coil 110.

Accordingly, the induced electromotive force generated in the reception coil 50 is significantly increased, and the charger 60 charges the battery by converting the induced electromotive force generated in the reception coil 50 into direct current.

Next, a charging method of an unmanned aerial vehicle according to one embodiment of the present invention will be described with reference to FIG. 5.

Figure 5:
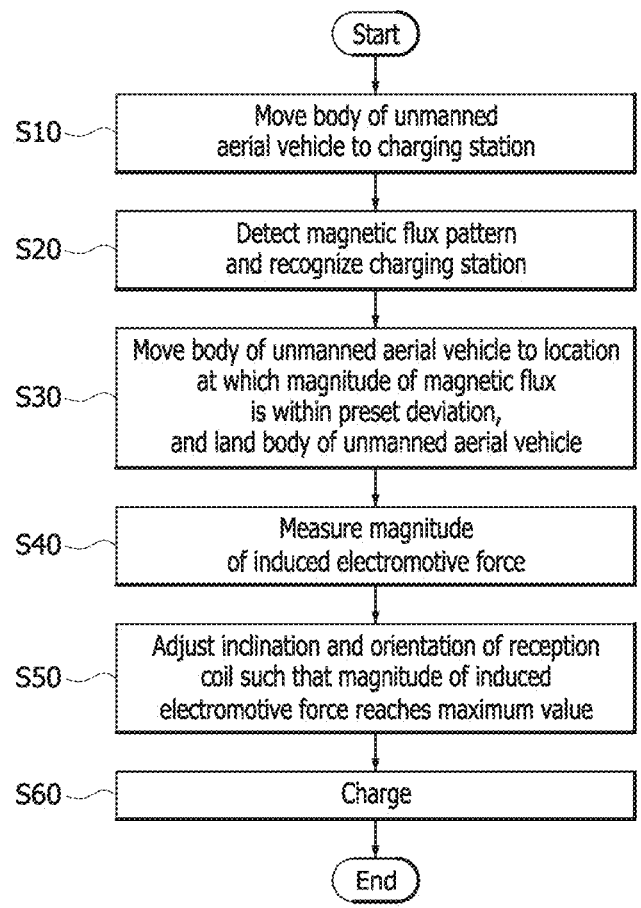
FIG. 5 is a flowchart of a charging method of an unmanned aerial vehicle according to one embodiment of the present invention.

FIG. 5 is a flowchart of a charging method of an unmanned aerial vehicle according to one embodiment of the present invention.

Referring to FIG. 5, upon receiving positional coordinates of an unmanned aerial vehicle from the GPS receiver 10, the controller 70 controls the drive module 20 based on the positional coordinates of the unmanned aerial vehicle and positional coordinates of the charging station 100 to move the body 90 of the unmanned aerial vehicle to the charging station 100 (S10). In this embodiment, the controller 70 may control an altitude and posture of the body 90 using an altitude sensor, an obstacle sensor and a gyro sensor such that the body 90 can be stably moved to the charging station 100 while avoiding an obstacle on a flight path.

After moving the body 90 to the charging station 100 based on the positional coordinates of the charging station 100, the controller 70 senses magnetic fluxes through the magnetic flux detectors 30 and detects a magnetic flux pattern based on the magnetic fluxes. Then, the controller 70 compares the detected magnetic flux pattern with a preset magnetic flux pattern stored therein to recognize the charging station 100 based on the comparison result (S20). Through this operation, the controller minimizes a positional error in the case of using only the positional coordinates of the charging station 100 and the positional coordinates of the unmanned aerial vehicle.

Next, the controller 70 compares the magnitudes of the magnetic fluxes detected by the magnetic flux detectors 3, detects a location of the charging station 100 generating a magnetic flux, the magnitude of which is within a preset range of deviation, and moves the body 90 to the corresponding location through the drive module 20 to land the body 90 (S30).

Similarity between the magnitudes of the magnetic fluxes relates to similarity between distances from the magnetic flux detectors 30 to the transmit coil 110. Thus, when the magnitude of magnetic flux is within the preset range of deviation, it can be concluded that the transmit coil 110 is located below the reception coil 50 in the perpendicular direction of the reception coil 50. As a result, coupling between the reception coil 50 and the transmit coil 110 can be significantly improved.

Thereafter, the controller 70 measures the magnitude of induced electromotive force generated in the reception coil 50 (S40).

The controller 70 adjusts an inclination and orientation of the reception coil 50 such that the measured electromotive force induced by the reception coil 50 reaches a maximum value (S50). Specifically, the controller 70 adjusts an angle of the reception coil 50 in the perpendicular direction through the inclination adjuster 42, and adjusts the rotational angle of the reception coil 50 in the horizontal direction through the orientation adjuster 41. As a result, the electromotive force induced by the reception coil 50 is significantly increased.

Thereafter, the charger 60 charges a battery by convening the induced electromotive force generated in the reception coil 50 into direct current (S60).

As such, the embodiments of the present invention improve coupling between the reception coil 50 of the unmanned aerial vehicle and the transmit coil 110 of the charging station through adjustment of an inclination and orientation of the reception coil 50 of the unmanned aerial vehicle towards the transmit coil 110 of the charging station after moving the unmanned aerial vehicle to the charging station 100, thereby improving charging efficiency.

Although some embodiments have been disclosed above, it should be understood that these embodiments are given by way of illustration only, and that various modifications, variations, and alterations can be made without departing from the spirit and scope of the present invention. Therefore, the scope of the present invention should be limited only by the accompanying claims and equivalents thereof.

DESCRIPTION OF REFERENCE NUMERALS

10: GPS receiver, 20: drive module, 30: magnetic flux detector, 40: reception coil adjuster, 42: inclination adjuster, 41: orientation adjuster, 50: reception coil, 60: charger, 70: controller, 80: substrate, 90: body, 100: charging station, 110: transmit coil

The invention claimed is:

1. A charging apparatus for unmanned aerial vehicles, comprising:
   a reception coil generating induced electromotive force according to variation of magnetic flux of a transmit coil which is provided to a charging station and generates a magnetic field;
   a reception coil adjuster adjusting at least one of an inclination and an orientation of the reception coil;
   a controller controlling at least one of the inclination and the orientation of the reception coil by controlling the reception coil adjuster according to magnitude of the induced electromotive force generated in the reception coil by the magnetic field generated in the transmit coil; and
   a plurality of magnetic flux detectors measuring a magnetic flux generated in the transmit coil and being arranged around the reception coil;
   wherein the controller controls the body of the unmanned aerial vehicle to land after moving the body of the unmanned aerial vehicle to a location at which magnitudes of the magnetic fluxes detected by the magnetic flux detectors are within a preset range of deviation.

2. The charging apparatus for unmanned aerial vehicles according to claim 1, wherein the controller controls the reception adjuster such that the induced electromotive force generated in the reception coil reaches a maximum value.

3. The charging apparatus for unmanned aerial vehicles according to claim 1,
   wherein the magnetic flux detectors sense a magnetic flux pattern based on the measured magnetic flux,
   wherein the controller recognizes the charging station based on the magnetic flux pattern sensed by the magnetic flux detectors.

4. The charging apparatus for unmanned aerial vehicles according to claim 3, wherein the magnetic flux detectors are provided to a lower side of the body of the unmanned aerial vehicle.

5. The charging apparatus for unmanned aerial vehicles according to claim 1, wherein the magnetic flux detectors are radially arranged around the reception coil.

6. The charging apparatus for unmanned aerial vehicles according to claim 1, further comprising:
a GPS receiver receiving a GPS signal from a global positioning system (GPS) satellite to detect positional coordinates of the unmanned aerial vehicle,
wherein the controller controls the unmanned aerial vehicle to move to the charging station based on positional coordinates of the charging station and the positional coordinates detected by the GPS receiver.

7. A charging apparatus for unmanned aerial vehicles, comprising:
a reception coil generating induced electromotive force according to variation of magnetic flux of a transmit coil which is provided to a charging station and generates a magnetic field;
a plurality of magnetic flux detectors measuring a magnetic flux generated in the transmit coil and sensing a magnetic flux pattern based on the measured magnetic flux; and
a controller recognizing a charging station based on the magnetic flux pattern sensed by the magnetic flux detectors,
wherein the magnetic flux detectors are arranged around the reception coil;
wherein the controller controls the body of the unmanned aerial vehicle to land after moving the body of the unmanned aerial vehicle to a location at which magnitudes of the magnetic fluxes detected by the magnetic flux detectors are within a preset range of deviation.

8. The charging apparatus for unmanned aerial vehicles according to claim 7, wherein the magnetic flux detectors are radially arranged about the reception coil.

9. The charging apparatus for unmanned aerial vehicles according to claim 7, wherein the magnetic flux detectors are provided to a lower side of the body of the unmanned aerial vehicle.

10. The charging apparatus for unmanned aerial vehicles according to claim 7, further comprising:
a GPS receiver receiving a GPS signal from a global positioning system (GPS) satellite to detect positional coordinates of the unmanned aerial vehicle,
wherein the controller controls the unmanned aerial vehicle to move to the charging station based on positional coordinates of the charging station and the positional coordinates detected by the GPS receiver.

11. A charging method of an unmanned aerial vehicle, comprising:
measuring, by magnetic flux detectors, a magnetic flux generated in a transmit coil of a charging station, and sensing a magnetic flux pattern based on the measured magnetic flux;
recognizing, by a controller, the charging station based on the magnetic flux pattern sensed by the magnetic flux detectors, and controlling a body of the unmanned aerial vehicle to land through a drive module; and
generating, by a reception coil, induced electromotive force according to variation of the magnetic flux of the transmit coil to charge a battery,
wherein in the step of controlling the body of the unmanned aerial vehicle to land through the drive module, the controller controls the body of the unmanned aerial vehicle to land after moving the body of the unmanned aerial vehicle to a location at which magnitudes of the magnetic fluxes detected by the magnetic flux detectors are within a preset range of deviation.

12. The charging method of an unmanned aerial vehicle according to claim 11, further comprising:
receiving, by a GPS receiver, a GPS signal from a GPS satellite to detect positional coordinates of the body of the unmanned aerial vehicle,
wherein the controller controls the body of the unmanned aerial vehicle to move to the charging station based on the positional coordinates detected by the GPS receiver through a drive module, followed by recognizing the charging station based on the magnetic flux patterns sensed by the magnetic flux detectors.

13. The charging method of an unmanned aerial vehicle according to claim 11, wherein in the step of charging the battery, the controller adjusts at least one of an inclination and an orientation of the reception coil through a reception coil adjuster such that the induced electromotive force generated by the reception coil reaches a maximum value.

14. The charging method of an unmanned aerial vehicle according to claim 11, further comprising:
controlling, by the controller, the body of the unmanned aerial vehicle to move to the positional coordinates of the charging station through the drive module based on the positional coordinates detected by a GPS receiver.

* * * * *